United States Patent
Mason

[15] 3,665,548
[45] May 30, 1972

[54] CABLE FAIRLEAD ASSEMBLY
[72] Inventor: Kurt E. Mason, Fullerton, Calif.
[73] Assignee: McDonnell Douglas Corporation
[22] Filed: Aug. 5, 1970
[21] Appl. No.: 61,053

[52] U.S. Cl. .................................. 16/2, 248/56, 285/159
[51] Int. Cl. ........................................................... F16l 5/00
[58] Field of Search ................. 16/2, 108, 109; 248/56; 285/159

[56] References Cited

UNITED STATES PATENTS

| | | | |
|---|---|---|---|
| 2,418,105 | 3/1947 | Wohler | 16/2 X |
| 3,016,562 | 1/1962 | Reid | 16/2 |
| 2,592,130 | 4/1952 | Erb et al. | 16/2 |
| 2,514,504 | 7/1950 | Moline | 16/2 |
| 2,717,792 | 9/1955 | Pelley | 16/2 |
| 2,787,486 | 4/1957 | Thiry | 16/2 |
| 3,056,852 | 10/1962 | Sachs | 16/2 X |
| 3,076,668 | 2/1963 | Famely | 248/56 X |

Primary Examiner—Bobby R. Gay
Assistant Examiner—Peter A. Aschenbrenner
Attorney—Walter J. Jason, Donald L. Royer and D. N. Jeu

[57] ABSTRACT

Cable fairlead assembly including an outer, retainer, sleeve element and an inner, diametrically divided, grommet element comprising two symmetrical tubular halves secured in position by the retainer to provide a cable passageway. The retainer element is a longitudinally slotted sleeve having a shaped outer surface to permit installation from either side of, and retention in, a panel hole of predetermined size. The inner surface of the retainer is shaped to accept and secure the two grommet halves in position when installed in the retainer from either end thereof.

8 Claims, 6 Drawing Figures

PATENTED MAY 30 1972 3,665,548

INVENTOR.
KURT E. MASON
BY
Dock N. Jew
- AGENT -

CABLE FAIRLEAD ASSEMBLY

BACKGROUND OF THE INVENTION

My present invention pertains generally to the field of control cable fairleads and more particularly to a cable fairlead assembly which provides exceptionally low frictional support and guidance for a moving cable.

Aircraft fairleads presently used for support and guidance of moving control cables are normally fabricated by injection molding processes. The materials which can be used in such processes, however, produce fairleads that have a certain amount of friction on the moving control cables supported and guided by them. While the amount of friction encountered is relatively small, there are instances in which it is desirable or necessary to reduce the friction produced by injection molded fairleads on their respective cables. Furthermore, the very low friction fairlead should be easily mounted on, or removed from, a control cable and also be easily installed in, or removed from, a supporting panel hole. It is also advantageous and sometimes necessary to have a low friction fairlead which can be readily and securely installed in a panel hole from either side of the panel.

SUMMARY OF THE INVENTION

Briefly, and in general terms, my invention is preferably accomplished by providing a cable fairlead assembly including an outer, retainer, sleeve element made of a relatively stiff (and moldable) material such as a suitable polyamide (nylon) and an inner, diametrically divided, grommet element made of a very low-friction (and machinable) material such as graphite-filled polytetrafluoroethylene. The grommet element comprises two identical tubular halves symmetrically arranged and secured in position as a unit by the retainer to provide a support and guide for a cable.

The retainer element is a longitudinally slotted sleeve having a shaped outer surface to permit installation from either side of, and retention in, a panel hole of predetermined size. The inner surface of the retainer is shaped to accept and secure the two grommet halves firmly in position when installed in the retainer from either end thereof. The outer surfaces of the grommet halves include a detent structure for engaging either of the complementary structures defining two longitudinally spaced channels or grooves in the inner surface of the retainer. The inner surfaces of the grommet halves are suitably shaped to form the cable passageway when the grommet halves are installed in the retainer.

BRIEF DESCRIPTION OF THE DRAWING

My invention will be more fully understood, and other features and advantages thereof will become apparent, from the following description of an exemplary embodiment of the invention. The description is to be taken in conjunction with the accompanying drawing, in which.

DESCRIPTION OF THE PRESENT EMBODIMENT

Figure 1:
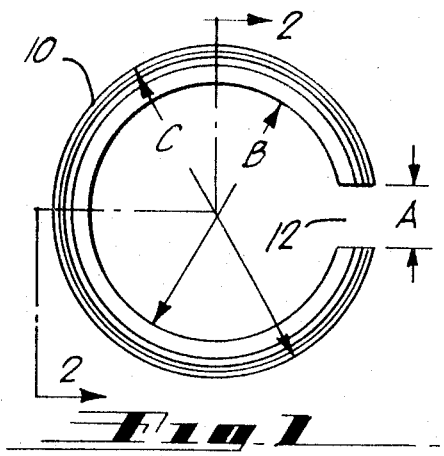
FIG. 1 is a side elevational view of the retainer element of a cable fairlead assembly constructed according to this invention.

FIG. 1 is a side elevational view of the outer, retainer, sleeve element 10 of my cable fairlead assembly. The retainer element 10 is generally a cylindrical sleeve including a longitudinal gap or slot 12 which is preferably of uniform width A. The retainer 10 has a minimum inner diameter B and a maximum outer diameter C as indicated in FIG. 1. The retainer 10 is preferably injection molded from a suitable polyamide compound material such as nylon which produces a fairly stiff (low flexibility) article.

Figure 2:
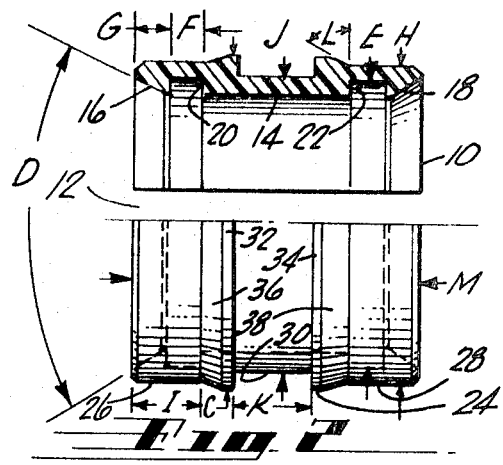
FIG. 2 is a sectional view of the retainer as taken along the line 2—2 indicated in FIG. 1.

FIG. 2 is a sectional view of the retainer 10 as taken along the line 2—2 indicated in FIG. 1. It can be seen that the retainer 10 is longitudinally symmetrical with respect to a plane perpendicular to its axis at the axial midpoint of the retainer. The cylindrical inner surface 14 is contoured or shaped at its ends to provide inwardly beveled surfaces 16 and 18, and rectangular cross sectional channels 20 and 22 located respectively adjacent longitudinally to the beveled surfaces. Each of the beveled surfaces 16 and 18 intersect in a central angle D, and the channels 20 and 22 each has a diameter E and axial length F. In the channels 20 and 22, the channel sides nearest to their respective ends of the retainer 10 are each located a distance G from the surfaces of such ends. The longitudinally spaced channels or annular grooves 20 and 22 are defined by respective complementary structures or catch means which can be selectively engaged by a detent structure provided on the outer surface of a grommet element to be described in detail later.

The cylindrical outer surface 24 of the retainer 10 is also contoured or shaped at its ends to provide left and right cylindrical surfaces 26 and 28 each having a diameter H and an axial length I. A rectangular cross sectional channel 30 is formed in the longitudinally central portion of the outer surface 24 and has a diameter J and an axial length K. The cylindrical rim surfaces 32 and 34 adjacent to the left and right edges of the central channel 30 are respectively connected to the end surfaces 26 and 28 with outwardly flared or beveled surfaces 36 and 38. Each of the rim surfaces 32 and 34 has the maximum diameter C, and the beveled surfaces 36 and 38 are each beveled at an angle L measured from a plane perpendicular to the axis of retainer 10. The retainer 10 has an overall length M.

Figure 3:
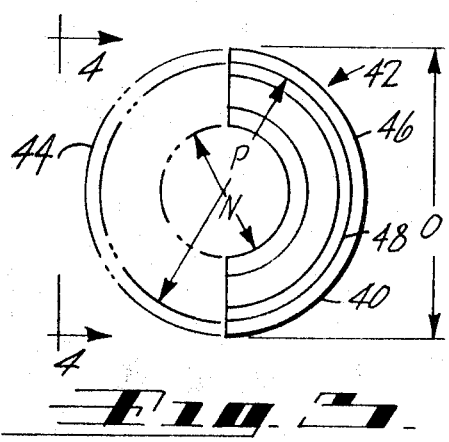
FIG. 3 is a side elevational view of one tubular half of the diametrically divided grommet element of the cable fairlead assembly.

FIG. 3 is a side elevational view of one tubular half 40 of a grommet element 42 which is formed with another identical tubular half 44 (simply indicated in phantom lines) held in diametrical face contact by the retainer 10. The grommet half 40 has a minimum inner diameter N and a maximum outer diameter O which is actually that of an annular ridge or detent structure 46. The major portion of the outer surface 48 of the grommet half 40 has a diameter P. The grommet half 40 is preferably machined from a rod of, for example, graphite-filled polytetrafluoroethylene which produces a very low-friction article.

Figure 4:
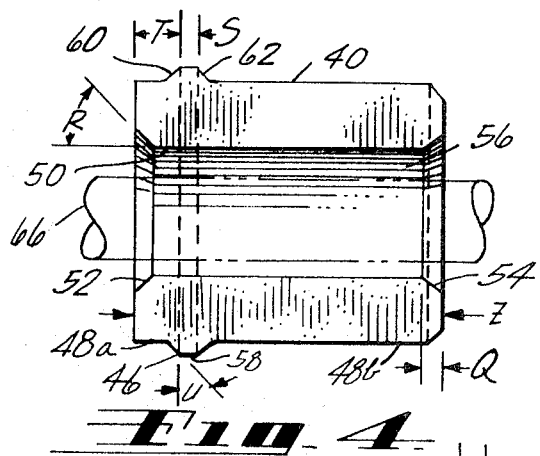
FIG. 4 is a front elevational view of the tubular half of the grommet element as taken along the line 4—4 indicated in FIG. 3.

FIG. 4 is a front elevational view of the grommet half 40 as taken along the line 4—4 indicated in FIG. 3. The cylindrical inner surface 50 is contoured or shaped at its ends to provide outwardly beveled surfaces 52 and 54. The surfaces 52 and 54 each has an axial length Q, and is beveled at an angle R measured with respect to the axis of the grommet half 40. It should be noted that where the grommet half 40 is relatively large, the beveled surfaces 52 and 54 are joined to their respective ends of the inner surface 50 by suitably curved surfaces so as to avoid any sharp corners at the surface junctions; that is, fully rounded corners may be necessary under certain conditions. The grommet halves 40 and 42 form a cable passageway 56 when held in diametrical face contact by the retainer 10.

The cylindrical outer surface 58 of the grommet half 40 has been contoured or shaped to provide cylindrical surfaces 48a and 48b respectively left and right of the detent structure 46, as shown in FIG. 4. The cylindrical surface 58 of detent structure 46 has the diameter O, and the cylindrical surfaces 48a and 48b each has the diameter P, as indicated in FIG. 3. The cylindrical detent surface 58 has an axial length S, and the left edge of such detent surface is located a distance T from the left end of the grommet half 40. The left and right surfaces 48a and 48b are connected to the detent surface 58 by outwardly beveled surfaces 60 and 62 each of which makes an angle U measured with respect to a plane perpendicular to the axis of the grommet half 40. The beveled surfaces 60 and 62 are preferably joined in small radii (0.01 inch in the following exemplary embodiment) junctions with the surfaces 48a and 48b, respectively.

The right end of the cylindrical surface 48b can be chamfered at an angle of 45° across an axial length of 0.02 inch, for example, in the exemplary embodiment of this invention having the following nominal or mean dimensional values as referred to FIGS. 1 through 4. A = 0.2 inch, B = 0.442 inch, C = 0.56 inch, D = 60°, E = 0.49 inch, F = 0.06 inch, G = 0.046 inch, H = 0.54 inch, I = 0.106 inch, J = 0.498 inch, K = 0.13 inch, L = 75°, M = 0.5 inch, N = 0.22 inch, O = 0.48 inch, P = 0.438 inch, Q = 0.03 inch, R = 45°, S = 0.03 inch, T = 0.08 inch, and U = 45°. The grommet half 44 can, of course, be substantially identical to the grommet half 40. The foregoing dimensions, and other dimensions or types of materials noted herein, of the cable fairlead assembly or its components are merely illustrative examples of the exemplary embodiment thereof and are not intended to limit the scope of my invention in any manner.

Figure 5:
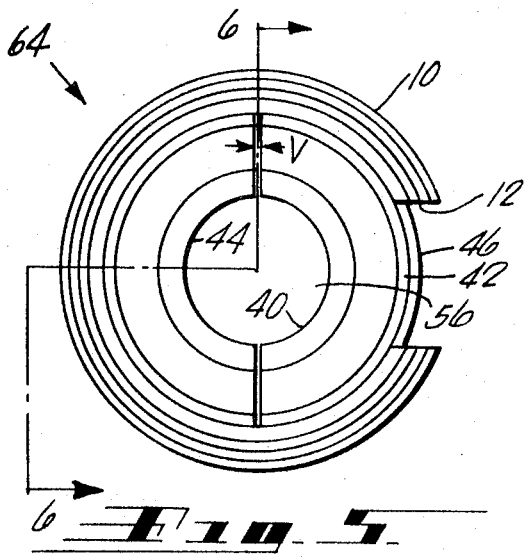
FIG. 5 is a side elevational view of the cable fairlead assembly.

FIG. 5 is a side elevational view of the cable fairlead assembly 64 including the grommet halves 40 and 44 secured in diametrical face contact as a unitary grommet element 42 by the retainer element 10. The retained grommet halves 40 and 44 are not to have a separation between their contacting faces greater than a dimension V which is equal to, for example, 0.01 inch in the exemplary embodiment given above. The cable passageway 56 of the grommet element 42 is used for a control cable 66 indicated in phantom lines in FIG. 4. The cable fairlead assembly 64, in this instance, is preferably used for a straight run of a ⅛ inch diameter, 1 × 19 control cable 66, for example. The diameter of the cable passageway 56 can be made somewhat smaller than proportionately indicated in FIG. 4; however, the indicated larger diameter allows a small but reasonable amount of cable angle to exist relative to the axis of the passageway (an angled run) without binding in an ordinarily straight run.

Figure 6:
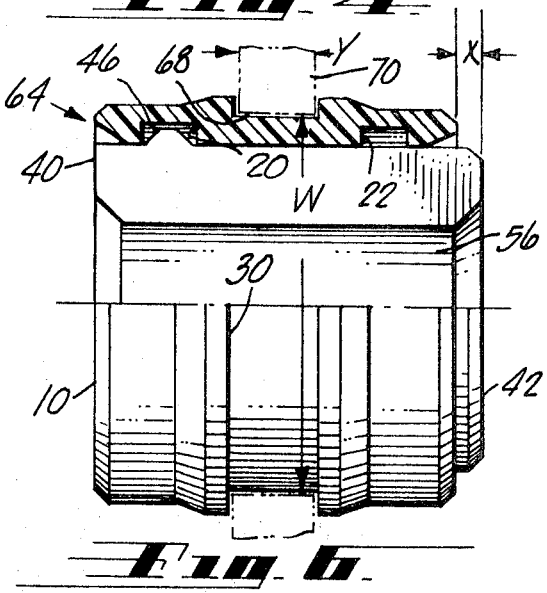
FIG. 6 is a sectional view of the cable fairlead assembly as taken along the line 6—6 indicated in FIG. 5.

FIG. 6 is a sectional and front elevational view of the cable fairlead assembly 64 as taken along the line 6—6 indicated in FIG. 5. The assembly 64 is shown installed in a panel hole 68 of panel 70 which is indicated sectionally in phantom lines. The panel hole 68 has a diameter W which can be equal to one-half inch for the exemplary embodiment of this invention given previously above. It can be seen from this figure that the right end of the grommet element 42 protrudes or extends an axial distance X beyond the corresponding end of its retainer 10. Again, for the exemplary embodiment given above, X = 0.04 inch, for example.

The panel 70 has a thickness Y which is preferably one-eighth inch for the retainer channel 30 having an axial length K of 0.13 inch. The axial length K of the retainer channel 30 is preferably about equal to the panel thickness Y which is preferably about one-quarter the overall length M of the retainer 10 and/or is sufficiently thick to support the cable fairlead assembly 64 firmly and rigidly. The thickness Y of the panel 70 (and channel 30 axial length K), however, should not be an excessively large fraction of the retainer 10 overall length M, for ease of installation and assembly of the fairlead assembly 64 in the panel hole 68. Each of the grommet halves 40 and 44 has an overall length Z (FIG. 4) which is, of course, equal to the sum of the retainer length M (FIG. 2) and the grommet protrusion distance X (FIG. 6). Thus, in the exemplary embodiment given above, Z = 0.54 inch, for example.

Installation and assembly of the cable fairlead assembly 64 in the panel hole 68 can be accomplished by first passing the control cable 66 (FIG. 4) running in the panel hole through the retainer slot 12 (FIG. 1) and into the retainer 10. The retainer 10 is then pressed into the panel hole 68 as shown in FIG. 6. Next, the grommet halves 40 and 44 are snapped into the panel-mounted retainer 10 about the cable 66 with the diametrically contacting faces of the grommet halves oriented generally at right angles to a diametrical axial plane bisecting the uniform width A of the slot 12 as illustrated in FIG. 5.

The grommet halves 40 and 44 can be inserted into the panel-mounted retainer 10 shown in FIG. 6 from either side of the panel 70. The chamfered ends of the grommet halves 40 and 44 are inserted into the retainer 10 until the detent structure 46 snaps into its complementary channel or groove 20 (or 22 if inserted from the right side of panel 70). Note that retainer slot 12 and the longitudinal locations of the channels 20 and 22 near respective ends of the retainer 10 permit ready flexing (raising) of the annular lips before their corresponding channels and, hence, easy installation of the grommet halves 40 and 44 in the panel-mounted retainer. The longitudinal slot 12 in the retainer 10 is also needed to allow the retainer to be easily installed in the panel hole 68. Conversely, the grommet halves 40 and 44 and retainer 10 can be easily removed from the panel hole 68 because of the retainer slot 12 and the longitudinal end locations of the channels 20 and 22. However, this cannot be accomplished quite as readily as installation.

It is to be understood that the exemplary embodiment of this invention as described above and shown in the accompanying drawing is merely illustrative of, and not restrictive on, the broad invention and that I do not desire to be limited in my invention to the exact details of construction or arrangement shown and described, since obvious modifications will occur to persons skilled in the art.

I claim:

1. Fairlead assembly for providing support and guidance to a cable passing therethrough, said assembly comprising:
   a retainer element including an outer sleeve;
   a grommet element including separate inner tubular sections retained in a unitary arrangement by said sleeve whereby a passageway for said cable is obtained; and
   means for securing said retainer and grommet elements in predetermined, axially fixed, positions relative to each other, said securing means including a detent means on said grommet element, and a complementary catch means on said retainer element for engaging said detent means and wherein said detent means includes at least a circumferential portion of an annular ridge located near a longitudinal end of said grommet element, and said complementary catch means includes at least a circumferential portion of structure defining an internal annular channel located near a corresponding longitudinal end of said retainer element.

2. The invention as defined in claim 1 wherein said complementary catch means further includes at least a circumferential portion of structure defining another internal annular channel located near the other longitudinal end of said retainer element whereby said grommet element can be installed in said retainer element from either end thereof.

3. The invention as defined in claim 1 wherein said sleeve includes a longitudinal slot therein.

4. The invention as defined in claim 3 wherein said sleeve includes means for attaching it to relatively fixed structure.

5. The invention as defined in claim 4 wherein said attaching means includes circumferential structure defining an external annular channel in said sleeve, and said relatively fixed structure includes a panel portion having circumferential structure defining a predetermined size hole therein, said external channel defining structure being provided for normally engaging said hole defining structure and firmly mounting said sleeve to said relatively fixed structure.

6. Fairlead assembly for providing support and guidance to a cable passing therethrough, said assembly comprising:
   a retainer element including an outer sleeve, said sleeve including a longitudinal slot therein and means for attaching it to relatively fixed structure, said attaching means including circumferential structure defining an external annular channel in said sleeve, and said relatively fixed structure including a panel portion having circumferential structure defining a predetermined size hole therein, said external channel defining structure being provided for normally engaging said hole defining structure and firmly mounting said sleeve to said relatively fixed structure;

a grommet element including inner tubular sections retained in a unitary arrangement by said sleeve whereby a passageway for said cable is obtained, said tubular sections comprising two substantially identical diametrically divided halves of said grommet element; and means for securing said retainer and grommet elements in predetermined, axially fixed, positions relative to each other, said securing means comprising a detent means on said grommet element and a complementary catch means on said retainer element for engaging said detent means, said detent means including at least a circumferential portion of an annular ridge located near a longitudinal end of said grommet element, and said complementary catch means including at least a circumferential portion of structure defining an internal annular channel located near a corresponding longitudinal end of said retainer element.

7. The invention as defined in claim 6 wherein said retainer element is fabricated of relatively stiff material, and said grommet element is fabricated of extremely stiff and very low friction material.

8. The invention as defined in claim 6 wherein said external channel is centrally located longitudinally on said sleeve, and said complementary catch means further includes at least a circumferential portion of structure defining another internal annular channel located near the other longitudinal end of said retainer element.

* * * * *